United States Patent
Lee et al.

(10) Patent No.: US 9,582,713 B2
(45) Date of Patent: Feb. 28, 2017

(54) APPARATUS AND METHOD FOR RECOGNIZING MEDIA AND FINANCIAL DEVICE

(71) Applicant: LG CNS CO., LTD., Seoul (KR)

(72) Inventors: Jung In Lee, Seoul (KR); Beum Yong Koo, Seoul (KR); Eun Ki Kim, Seoul (KR); Joong Ho An, Seoul (KR); Han Cheol Cho, Seoul (KR)

(73) Assignee: LG CNS CO., LTD., Seoul (KR)

( * ) Notice: Subject to any disclaimer, the term of this patent is extended or adjusted under 35 U.S.C. 154(b) by 0 days.

(21) Appl. No.: 14/755,452

(22) Filed: Jun. 30, 2015

(65) Prior Publication Data
US 2015/0379338 A1    Dec. 31, 2015

(30) Foreign Application Priority Data
Jun. 30, 2014    (KR) .................. 10-2014-0081360

(51) Int. Cl.
*G06K 9/00*    (2006.01)
*G06K 9/18*    (2006.01)
(Continued)

(52) U.S. Cl.
CPC ......... *G06K 9/00442* (2013.01); *G06K 9/186* (2013.01); *G06K 9/3275* (2013.01);
(Continued)

(58) Field of Classification Search
CPC .... G06K 9/00442; G06K 9/2018; G06K 9/54; G06K 9/6202; G06K 2017/0064;
(Continued)

(56) References Cited

U.S. PATENT DOCUMENTS

| | | | | |
|---|---|---|---|---|
| 5,590,224 A | * | 12/1996 | Fast | ..................... G06K 9/3283 |
| | | | | 382/173 |
| 8,345,947 B2 | | 1/2013 | Koretsune | |
| 8,371,429 B2 | * | 2/2013 | Hamasaki | ............. G07F 19/202 |
| | | | | 194/206 |

FOREIGN PATENT DOCUMENTS

| | | |
|---|---|---|
| JP | H06318246 A | 11/1994 |
| JP | 2010225013 A | 10/2010 |

(Continued)

OTHER PUBLICATIONS

Notice of Allowance dated Jan. 21, 2016 in Korean Application No. 10-2014-0081360, (2 pages).

*Primary Examiner* — Mark Beauchaine
(74) *Attorney, Agent, or Firm* — Saliwanchik, Lloyd & Eisenschenk

(57) ABSTRACT

The present disclosure relates to an apparatus and a method for recognizing media and a financial device. The apparatus for recognizing media according to an exemplary embodiment of the present disclosure comprises: an image sensor; a skew detector configured to detect skew of the media from media image acquired by the image sensor; a noise detector configured to detect a linear component in a region of interest which include character of the media image and a noise included in the media image based on direction information of the detected linear component and the skew of the media; and a controller configured to remove the detected noise from the region of interest and recognize the character of the region of interest from which the noise is removed.

18 Claims, 9 Drawing Sheets

(51) Int. Cl.
*G06K 9/32* (2006.01)
*G06K 9/46* (2006.01)
*G07D 7/20* (2016.01)
*G06K 17/00* (2006.01)

(52) U.S. Cl.
CPC ......... *G06K 9/4647* (2013.01); *G07D 7/2008* (2013.01); *G06K 2017/0064* (2013.01)

(58) Field of Classification Search
CPC ................... G06T 7/003; G06T 7/0083; G06T 2207/10004; G06T 2207/30176; G07D 7/12; G07D 7/20
USPC .... 194/302; 382/112, 135, 296; 250/559.05, 250/559.07
See application file for complete search history.

(56) References Cited

FOREIGN PATENT DOCUMENTS

| | | |
|---|---|---|
| JP | 5108030 B2 | 12/2012 |
| KR | 20090062115 A | 6/2009 |

* cited by examiner

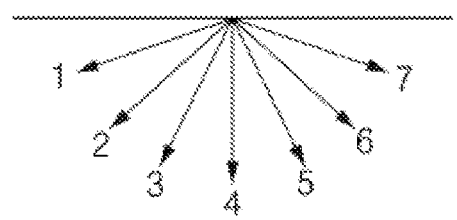
FIG. 4
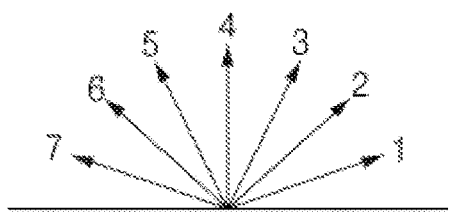
FIG. 5
|     | $X_{A3}$ | $X_{A5}$ | $X_{A7}$ | $X_{A10}$ |
|-----|------|------|------|------|
| (a) | 70   | 90   | 105  | 127  |
| (b) | 4    | 3    | 4    | 5    |
FIG. 6

|     | $X_{A3}$ | $X_{A5}$ | $X_{A7}$ | $X_{A10}$ |
|-----|------|------|-------|-------|
| (a) | 70   | 90   | 105   | 127   |
| (b) | 4    | 3    | 4     | 5     |

|     | $X_{B1}$ | $X_{B4}$ | $X_{B8}$ |
|-----|------|------|-------|
| (a) | 50   | 80   | 100   |
| (b) | 1    | 3    | 4     |

APPARATUS AND METHOD FOR RECOGNIZING MEDIA AND FINANCIAL DEVICE

CROSS-REFERENCE TO RELATED APPLICATION

This application claims the benefit under 35 U.S.C. §119 of Korean Patent Application No. 10-2014-0081360, filed Jun. 30, 2014, which is hereby incorporated by reference in its entirety.

TECHNICAL FIELD

The present disclosure relates to an apparatus and a method for recognizing media and a financial device.

BACKGROUND

When media are inserted, a financial device recognizes the inserted media to discriminate the denomination and the authenticity thereof. According to the discriminated result, the financial device executes deposit and withdrawal processing on the corresponding media.

Herein, an apparatus for recognizing media applied to the financial device uses a contact image sensor (CIS) to acquire images of the media and analyzes features of the images of the acquired media to identify the corresponding media or discriminate the authenticity of the corresponding media. For example, a check is printed with characters using magnetic ink. In this case, the financial device reads a magnetic ink character (MIC) printed on the check by a magnetic ink character reader (MICR) to recognize the MIC.

However, when foreign objects are attached to the contact image sensor, images acquired by the corresponding sensor have noise like a vertical stripe. In recognizing the MIC printed on the check, the MIC is wrongly recognized as wrong characters or it is difficult to set the character recognition range, due to the noise.

Further, extra costs are required to remove the foreign objects attached to the image sensor.

SUMMARY

The present disclosure has been made to solve the above-mentioned problems occurring in the prior art while advantages achieved by the prior art are maintained intact.

An aspect of the present disclosure provides an apparatus and a method for recognizing media and a financial device capable of detecting and removing noise formed in a predetermined direction from a region of interest (ROI) on media image and precisely recognizing character by recognizing character from a region of interest (ROI) from which noise is removed.

According to an exemplary embodiment of the present disclosure, an apparatus for recognizing media comprises: an image sensor; a skew detector configured to detect skew of the media from media image acquired by the image sensor; a noise detector configured to detect a linear component in a region of interest which include character of the media image and a noise included in the media image based on direction information of the detected linear component and the skew of the media; and a controller configured to remove the detected noise from the region of interest and recognize the character of the region of interest from which the noise is removed.

According to another exemplary embodiment of the present disclosure, a method for recognizing media comprises: detecting skew of corresponding media based on media image acquired from an image sensor; detecting a linear component in a region of interest including character among media image of which the positions are corrected, based on the skew of the media; detecting noise included in the media image based on direction information of the detected linear component and the skew of the media; and removing the detected noise from the region of interest and recognizing the character of the region of interest from which the noise is removed.

According to still another exemplary embodiment of the present disclosure, a financial device comprises: a customer access module device configured to have media inserted thereinto and released therefrom; a bill validator configured to recognize a denomination and authenticity of the inserted media; and a controller configured to process deposit and withdrawal trading using the corresponding medium depending on the recognized result of the bill validator and whether the inserted media is an abnormal medium, wherein the bill validator detects skew of the media from the media image acquired by an image sensor, detects linear components for a region of interest including character among the media image, and detects noise included in the media image based on direction information of the detected linear component and skew of the media to recognize character of the region of interest from which the noise is removed.

BRIEF DESCRIPTION OF THE DRAWINGS

The above and other objects, features and advantages of the present disclosure will be more apparent from the following detailed description taken in conjunction with the accompanying drawings.

FIGS. 3 to 11 are exemplified diagrams referenced for describing an operation of detecting noise of the apparatus for recognizing media according to the exemplary embodiment of the present disclosure;

DETAILED DESCRIPTION

Figure 1:
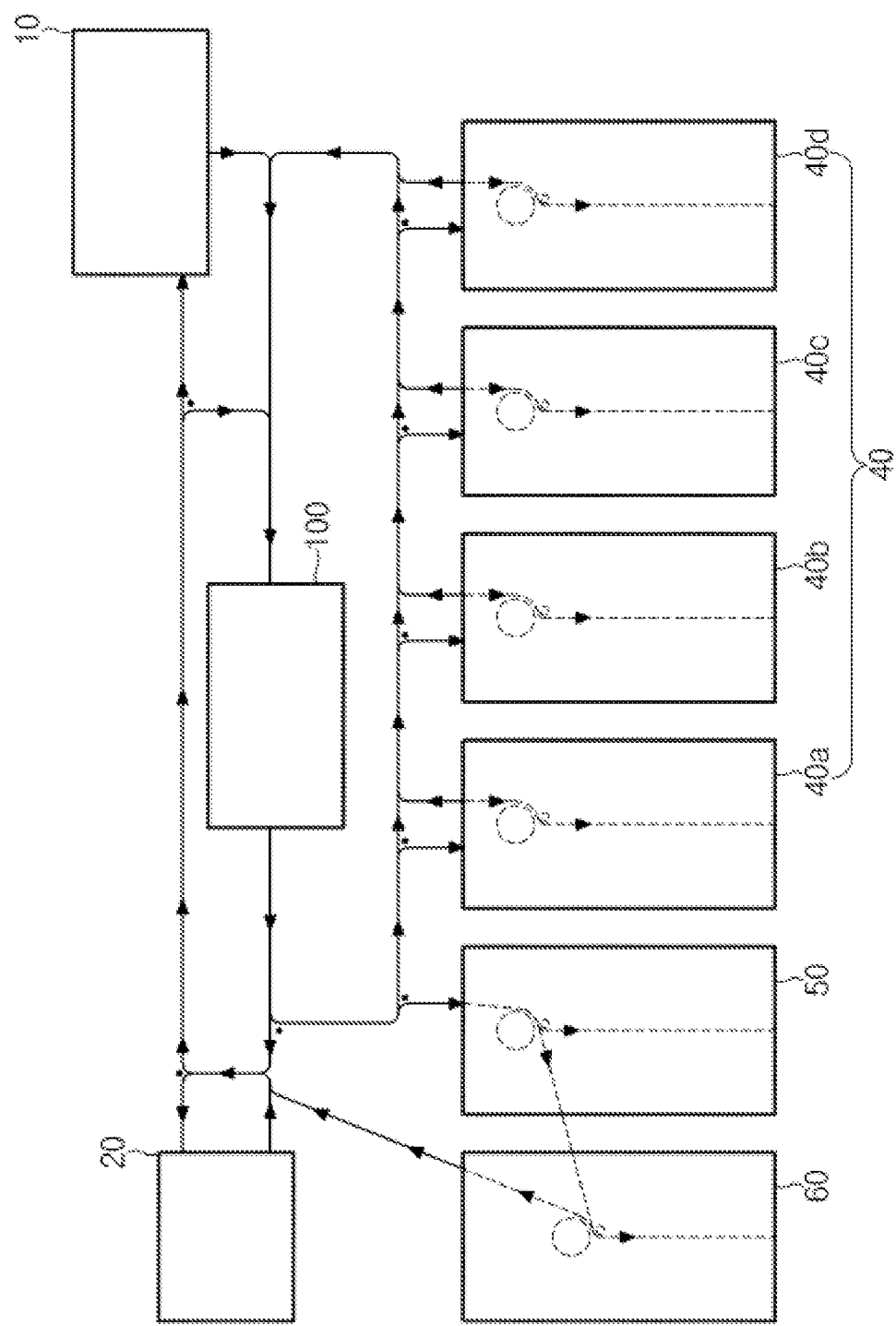
FIG. 1 is a diagram illustrating a configuration of a financial device to which an apparatus for recognizing media according to an exemplary embodiment of the present disclosure is applied.

Hereinafter, some exemplary embodiments in the present specification will be described in detail with reference to the illustrative drawings. It is to be noted that in adding reference numerals to elements of each drawing, like reference numerals refer to like elements even though like elements are shown in different drawings. Further, in describing exemplary embodiments of the present disclosure, wellknown functions or constructions will not be described in detail since they may unnecessarily obscure the understanding of the present disclosure.

In addition, in describing components of exemplary components of the present disclosure, terms such as first, second, A, B, (a), (b), etc., can be used. These terms are used only to differentiate the components from other components. Therefore, the nature, times, sequence, etc., of the corresponding components are not limited by these terms. When any components are "connected", "coupled", or "linked" to other components, it is to be noted that the components may be directly connected or linked to other components, but the components may be "connected", "coupled", or "linked" to other components via another component therebetween.

A financial device according to an exemplary embodiment of the present disclosure is a device which receives various media such as a note, securities, a gin), a coin, and a gift certificate to execute medium processing such as processings like deposit processing, giro receipt, and gift certificate exchange, etc., and/or processings like withdrawal processing, a gin) release, a gift certificate release, etc., to thereby execute financial businesses. An example of the financial device may include an automated teller machine (ATM) such as a cash dispenser (CD) and a cash recycling device. However, the financial device is not limited to the foregoing example, and therefore may be an apparatus for automating financial businesses like a financial information system (FIS).

Media applied to the present disclosure include notes like a cash, a check, etc., and may include a trading means which is formed of paper like securities, a gift certificate, etc. The media may be printed with information like a serial number, a denomination, etc., for recognizing the corresponding media and a magnetic component for identifying a forgery may be printed in a specific region of the media in a specific pattern.

Further, in describing an operation of recognizing character from a region of interest (ROI), the present disclosure describes recognizing character, which is marked by character like Hangeul, alphabetical character, numbers, special character, etc., which are included in the region of interest. Therefore, character described in the exemplary embodiment of the present disclosure is not limited to any one.

Hereinafter, exemplary embodiments of the present disclosure will be described with reference to the accompanying drawings.

FIG. 1 is a diagram illustrating a configuration of a financial device to which an apparatus for recognizing media according to an exemplary embodiment of the present disclosure is applied.

Referring to FIG. 1, a financial device according to the exemplary embodiment of the present disclosure may include a customer access module (CAM) device 10, a temporary stacker (TSK) 20, a cassette (CST) 40, a recycling cassette (R-CST) 50, a supplementary recycling cassette 60, and a bill validator (BV) 100.

First, the customer access module device 10 is a means for inserting or releasing media like a cash, a check, etc. The customer access module device 10 is provide with a media receiving space accessible by a customer, in which the media receipt space may selectively communicate with the outside by a shutter, etc. Further, the customer access module device 10 may include a pickup means for separating the media from the media receiving space one by one and transferring the media when the customer deposits the media, an integrated means for integrating and releasing the transferred media when a customer withdraws the media, etc.

The temporary stacker 20 temporarily keeps media recognized by the bill validator 100 for a customer to finally confirm the deposit before the media is deposited in storing units 40a to 40d.

The cassette 40 may include a number of storing units 40a to 40d which receives media discriminated by the bill validator 100 depending on a kind of media. In this case, the cassette 40 may keep media in each of the storing units 40a to 40d depending on denominations of media. When a media withdrawing command is input, the storing units 40a to 40d in which the corresponding media are received pick up the received media and provides the picked up media to the customer access module device 10.

The recycling cassette 50 receives the media which are recognized as abnormal media by the bill validator 100. Further, the recycling cassette 50 may also receive media which a customer does not collect, among media withdrawn by a customer's request.

The supplementary recycling cassette 60 keeps media to supplement media which are received in the cassette 40. In this case, the media kept in the supplementary recycling cassette 60 are transferred to the bill validator 100, classified by the bill validator 100 depending on a kind of media, and received in the corresponding cassette 40. In some cases, the supplementary recycling cassette 60 may temporarily receive the media inserted through the customer access module device 10.

The bill validator 100 recognizes the media inserted from the customer to identify the information of the corresponding media and recognize the authenticity of the corresponding media. In this configuration, the bill validator 100 may include a contact image sensor (CIS) which acquires image for identifying the media inserted into the bill validator 100. In this case, the bill validator 100 may detect skew of the media from the media image acquired by the contact image sensor. Further, the bill validator 100 may detect noise by setting a region which include character of the media image as the region of interest, and remove the noise detected from the region of interest and then recognize character.

Here, the region of interest may be a portion of region or the entire region of the media image acquired by the contact image sensor. Further, the region of interest may include only character printed on the media and may also include the character printed on the media and a background of the media. Further, the region of interest may be previously set based on a standard of the media and may also be set as a region in which character is recognized from the medium image after the medium image are acquired. The character included in the medium image may be a character string including at least one individual character.

Meanwhile, the abnormal media recognized by the bill validator 30 may again return to a customer through the customer access module device 10.

Figure 2:
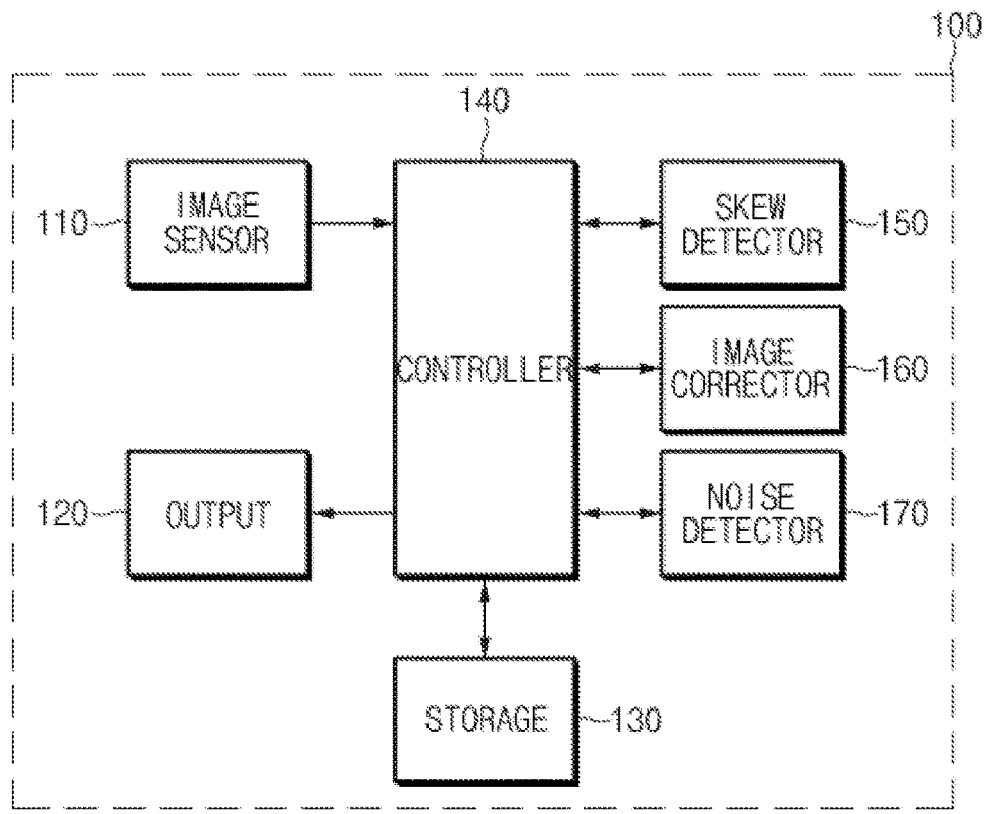
FIG. 2 is a block diagram illustrating a configuration of the apparatus for recognizing media according to the exemplary embodiment of the present disclosure.

The bill validator 100 may correspond to the apparatus for recognizing media illustrated in FIG. 2. Thus, the bill validator and the apparatus may be explained by the same symbol 100 in the exemplary embodiment of the present disclosure. A configuration of the apparatus for recognizing media according to the exemplary embodiment of the present disclosure will be described in detail with reference to FIG. 2.

FIG. 2 is a diagram illustrating the apparatus for recognizing media according to the exemplary embodiment of the present disclosure. Referring to FIG. 2, the apparatus 100 for recognizing media includes an image sensor 110, an output 120, a storage 130, a controller 140, a skew detector 150, an image corrector 160, and a noise detector 170. In this configuration, the controller 140 may control an operation of each unit of the apparatus 100 for recognizing media.

The image sensor 110 is a sensor which acquires an image for identifying media inserted into the apparatus 100 for recognizing media and may be the contact image sensor (CIS) The image sensor 110 may acquire image information on the corresponding media by a method of using light-emitting diodes (LEDs) to emit light to the inserted media and receiving light reflected from the corresponding media.

The media image acquired by the image sensor 110 may be transferred to the controller 140. In this case, the controller 140 may provide the corresponding image to the skew detector 150, the image corrector 160, and the noise detector 170, respectively, to process the media image transferred from the image sensor 110. Therefore, the controller 140 may recognize the denomination from the media image, recognize character from the region of interest on the corresponding media image, and output the recognized result.

The output 120 outputs a media recognition result finally recognized by the controller 140 to the outside. As illustrated in FIG. 1, when the apparatus 100 for recognizing media is implemented in the financial device, the output 120 may transfer the media recognition result output by the controller 140 to internal units of the financial device.

The storage 130 may store a setting value for operating the apparatus 100 for recognizing media. In other words, the storage 130 may store setting values for operating the image sensor 110 and may store an algorithm for identifying media or detecting noise from the region of interest on the media image. Further, the storage 130 may store feature information which allows the apparatus 100 for recognizing media to identify each medium or discriminate the authenticity of the media. The information stored in the storage 130 may be called by each unit of the apparatus 100 for recognizing media to be used.

The controller 140 analyzes the media image transferred from the image sensor 110 to recognize the denominations of the corresponding media. In this configuration, the skew detector 150 may detect the skew of the corresponding media based on the media image transferred from the controller 140. In this case, the skew information of the media detected by the skew detector 150 may be provided to the image corrector 160 and the noise detector 170, respectively.

The image corrector 160 uses the skew information detected by the skew detector 150 to perform a position correction on the corresponding media image in a horizontal direction or a vertical direction to a progressing direction of the corresponding media. The media image of which the position is corrected by the image corrector 160 is transferred to the controller 140. In this case, the controller 140 analyzes the media image of which the positions are corrected by the image corrector 160 to recognize the denominations of the corresponding media.

The controller 140 may recognize the information of the corresponding media such as the character strings (for example, serial number, etc.) including individual character included in the media image from the region of interest on the media image. When noise is detected in the character string included in the media image, the controller may recognize the individual character corresponding to the region in which the noise is positioned as an irrecognizable character. In this case, to remove the noise from the region of interest on the media image, the controller 140 may extract the region of interest from the media image and provide the extracted region of interest to the noise detector 170. The noise detector 170 detects the noise from the region of interest on the media image provided from the controller 140. For example, the noise detector 170 may detect the noise formed in the region of interest in a predetermined direction while the media image inserted into the apparatus 100 for recognizing media is acquired. Herein, the noise formed in the predetermined direction may be linear noise formed in at least one of a horizontal direction, a vertical direction, and a diagonal direction, for example.

In this case, the noise detector 170 extracts a linear component depending on a brightness value for the region of interest on the media image. Here, the linear component means linear noise which is detected in the region of interest on the media image. The noise detector 170 may use the direction of the extracted linear component and the skew information of the media detected by the skew detector 150 to detect the noise. Herein, the noise means a linear component matching the skew of the medium, among at least one linear component. In this case, the direction information of the linear component may be determined based on at least two portion of the linear component detected from the media image.

The noise detector 170 may detect noise formed in the region of interest in a predetermined direction, at an upper portion and a lower portion of the region of interest. In this case, the noise detector 170 may include a first detector and a second detector which detect the linear components for a plurality of different directions. In this configuration, the first detector and the second detector may be disposed to face each other. The first detector and the second detector may extract M pixel values for the plurality of different directions and detect the linear component formed in a predetermined direction based on the extracted M pixel values. In this case, the first detector and the second detector may detect the linear components based on the brightness of the M pixel values and may detect the linear components using, for example, an average value.

The noise detector detects the linear component based on a position and a direction of the noise data detected by allowing the first detector and the second detector to scan a second region and a third region in one direction along an x axis. Here, when the noise data are detected by moving the first detector along the x axis, the noise detector 170 positions the second detector at the position corresponding to the position in which the noise data are detected by the first detector. When the noise data of the direction corresponding to the direction of the noise data detected by the first detector is detected by the second detector, the noise detector 170 may determine that the linear component is present at the corresponding position of the region of interest.

Further, the noise detector 170 may recognize the skew of the media detected by the skew detector 150, determine the detecting direction of the linear component by the first detector and the second detector based on the skew of the recognized media, and detect the linear component matched with the determined detecting direction. Further, the noise detector 170 may also detect linear components for N directions at each point where the position moves at the upper and lower portions for the region of interest.

Meanwhile, the region of interest may include a first region in which character is printed, a second region which is an upper guide region including the background of the media in an upper direction of the first region, and a third region which is a lower guide region including the background of the media in a lower direction of the first region. Further, the region of interest may include only the first region, but the following exemplary embodiment will describe an operation of detecting noise when the region of interest includes all of the first to third regions. However, it is assumed that the second region and the third region is an empty region in which a specific background image is not printed.

In this case, the first detector which is disposed at the upper portion of the region of interest detects the noise data from the second region and the second detector which is disposed at the lower portion of the region of interest detects the noise data from the third region.

Here, the first detector and the second detector may detect brightness from the second region and the third region of the region of interest at the position where the corresponding detector is disposed. In this case, the noise detector 170 detects the region in which the brightness equal to or less than a preset threshold in one direction within the second region and the third region is detected as the linear component and extracts the information of both of the position and the direction where the corresponding linear component is detected.

In this case, the brightness values detected in each direction corresponding to the disposition position of the first detector and the second detector may be stored in the storage 130. According to the exemplary embodiment of the present disclosure, when the regions detected by the first detector and the second detector are a region in which the brightness equal to or less than the preset threshold in one direction is detected, the position and direction information of the detected linear component may also be stored in the storage 130.

The noise detector 170 extracts the linear component where the direction of the detected linear component matches the directions of the skew of the media detected by the skew detector 150. When the linear component detected in the second region and the third region of the region of interest among the extracted linear components are paired, the noise detector 170 detects the corresponding linear component as noise.

For example, when vertical stripe-like noise occurs, the linear component needs to be detected at a similar position corresponding to the detected position and direction information on the upper and lower portions of the region of interest, respectively. Therefore, the noise detector 170 may compare the detection position of the linear component detected in the second region with the detection position of the linear component detected in the third region and detect the case in which each detected position is in an error range as one noise. In this case, the error range may be a preset error range and may also be set based on at least one of the size of the region of interest and the detected skew information.

For example, when the media are inserted in the state in which it is skewed to skew 2, the financial device corrects the media image as much as skew 2 to acquire a forward direction image.

In this case, the error range is calculated by applying skew information at the time of detecting the noise for the region of interest on the media image, in which the error range for the position at which the noise is detected may be calculated based on the following [Equation 1].

$$W = H \times \frac{1}{\cos\theta} \qquad \text{[Equation 1]}$$

In the above Equation 1, W represents an error width for the position at which the noise is detected, H represents a height of the region of interest, and θ represents an angle at which the image rotates by skew.

Therefore, the smaller the skewed angle of the medium image, the narrower the error width and the larger the skewed angle of the media image, the wider the error width. The noise detector 170 may remove the detected noise from the region of interest and provide the information of the region of interest from which the noise is removed to the controller 140. According to the exemplary embodiment of the present disclosure, the noise detector 170 may provide the detected noise information to the controller 140 and the controller 140 may remove the noise from the region of interest based on the noise information detected by the noise detector 170 and then recognize character from the region of interest from which the noise is removed.

Therefore, the controller 140 may generate the media recognition result from the media image and output the media recognition result through the output 120. For example, the media recognition result output from the output 120 may be used to process the media which is traded through the financial device.

Figure 3:
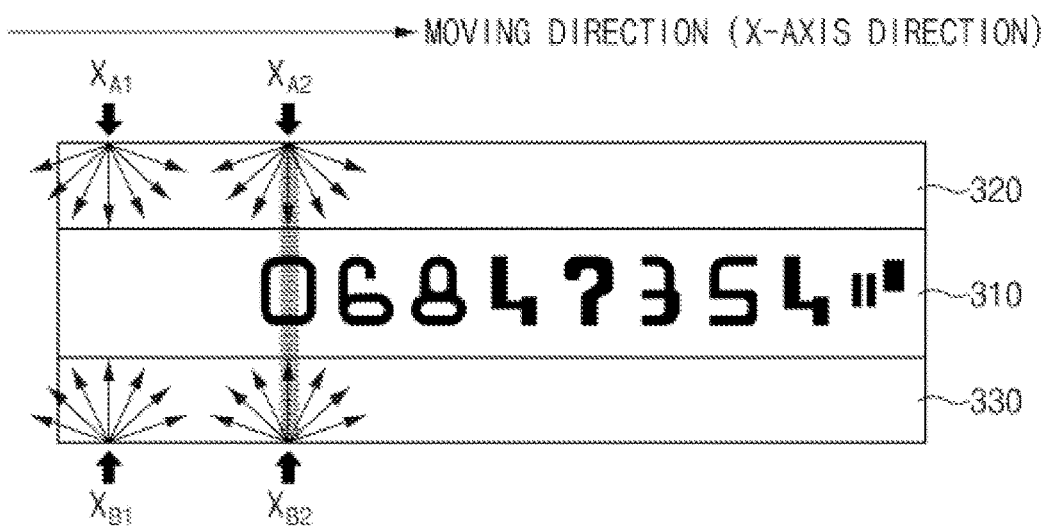

FIG. 3 is an exemplified diagram illustrating the region of interest on the media image inserted into the apparatus for recognizing media according to the exemplary embodiment of the present disclosure.

Referring to FIG. 3, in the region of interest on the media image, a first region 310 in which character, for example, a serial number like "06847354" are printed may be positioned at the middle and a second region 320 and a third region 330 recognized by the first detector and the second detector as a guide region corresponding to a background image of the media may be positioned at the upper portion and the lower portion of the first region 310.

In this case, the first detector may be disposed in the second region 320, that is, a first point XA1 at the left of the upper portion and the second detector may be disposed in the third region 330, that is, a first point XB1 at the left of the lower portion, based on the X-axis direction of the region of interest. Here, the first detector may be disposed so that the detecting direction of the linear component directs to the first region and may detect the linear component for a plurality of different directions within the second region based on the first point XA1 of the upper portion. Further, the second detector may be disposed to be toward the first region so that it faces the first detector and may detect the linear component for the plurality of different directions within the third region based on the second point XB1 of the lower portion.

When the detection is completed at the first points XA1 and XB1 of the upper portion and the lower portion, the first detector and the second detector each detect the linear components for the second region and the third region again at second points XA2 and XB2 moving by a predetermined distance in the X-axis direction. In other words, the first detector may detect the linear components for the plurality of different directions within the second region based on the second point XA2 of the upper portion. Further, the second detector may detect the linear components for the plurality of different directions within the third region based on the second point XA2 of the lower portion.

By doing so, the first detector and the second detector moves in the X-axis direction in the region of interest and may detect one or more linear component which is formed in the second region 320 and the third region 330.

Here, as illustrated in FIG. 4, the first detector may detect the linear components for N directions from the left to the right based on a point XA at which the first detector is positioned. FIG. 4 illustrates an embodiment implemented to detect linear components for a total of seven directions.

Meanwhile, the second detector may detect the linear components for N directions from the right to the left based on a point XB at which the second detector is positioned. Like FIG. 4, FIG. 5 illustrates an embodiment implemented to detect linear components for a total of seven directions.

In the embodiments of FIGS. 4 and 5, for convenience of explanation, each direction is denoted by numbers. In this case, for the detection direction of the first detector and the detection direction of the second detector are paired, the first detector sequentially assigns Nos. 1 to 7 from the left to the right in the second region based on the point XA at which the first detector is positioned. Meanwhile, the second detector sequentially assigns numbers 1 to 7 from the right to the left of the third region based on the point XB at which the second detector is positioned. As such, the first detector and the second detector each detects the linear components to the same number of directions.

FIGS. 3 to 5 illustrate that the first detector and the second detector each detect the linear components for the plurality of different directions in the second region and the third region of the region of interest but may also detect the linear component matched with any one direction determined based on the skew of the media.

Figure 7:
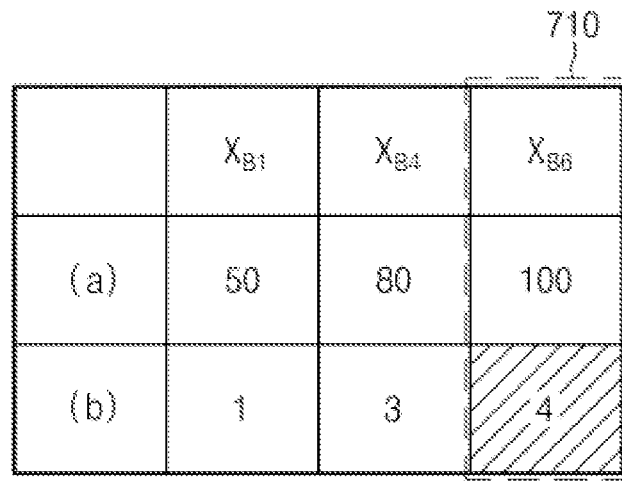
Figure 8:
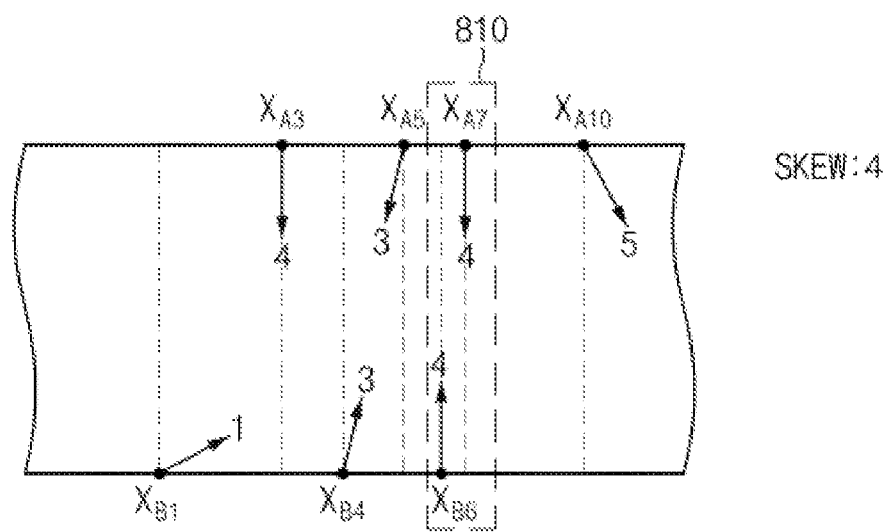

The embodiment of the operation of detecting the linear component for the predetermined direction based on the skew of the media by using the first detector and the second detector from the region of interest illustrated in FIGS. 3 to 5 will be described in more detail with reference to FIGS. 6 to 8. Therefore, FIGS. 6 to 8 illustrate the embodiment of the case in which the skew of the medium is 4.

First, FIG. 6 illustrates the linear component detected by the first detector. In FIG. 6, (a) illustrates the position of the first detector at the upper portion of the media recognition region and (b) illustrates the direction in which the first detector detects the linear component at the position illustrated in (a).

The apparatus for recognizing media detects data having brightness values which are equal to or less than a preset threshold, among the linear components detected by the first detector. For example, if it is assumed that data detected at XA3, XA5, XA7, and XA10 among the noise data detected by the first detector are detected as the linear components, a position of the XA3 is 70 and a direction of the XA3 in which the linear component is detected is No. 4 direction illustrated in FIG. 4. Further, a position of the XA5 is 90 and a direction of the XA5 in which the linear component is detected is No. 3 direction illustrated in FIG. 4. A position of the XA7 is 105 and a direction of the XA7 in which the linear component is detected is No. 4 direction illustrated in FIG. 4. A position of the XA10 is 127 and a direction of the XA10 in which the linear component is detected is No. 5 direction illustrated in FIG. 4.

In this case, if it is assumed that the skew of the corresponding medium detected from the media image by the apparatus for recognizing media is 4, the apparatus for recognizing media may extract the linear component corresponding to the same No. 4 direction as the skew of the media among the linear components illustrated in FIG. 6. In FIG. 6, like reference numerals 610 and 620, each of the directions of the XA3 and the XA7 in which the linear components are detected corresponds to 4.

Meanwhile, FIG. 7 illustrates the linear component detected by the second detector. In FIG. 7, (a) illustrates the position of the second detector at the lower portion of the media recognition region and (b) illustrates the direction in which the second detector detects the linear component at the position illustrated in (a).

The apparatus for recognizing media detects data having brightness values which are equal to or less than the preset threshold, among the linear components detected by the second detector. For example, if it is assumed that data detected at XB1, XB4, and XB6 among the linear components detected by the second detector are detected as the linear components, a position of the XB1 is 50 and a direction of the XB1 in which the linear component is detected is No. 1 direction illustrated in FIG. 4. Further, a position of the XB4 is 80 and a direction of the XB4 in which the linear component is detected is No. 3 direction illustrated in FIG. 4. A position of the XB6 is 100 and a direction of the XB6 in which the linear component is detected is No. 4 direction illustrated in FIG. 4.

In this case, if it is assumed that the skew of the corresponding medium detected from the medium image by the apparatus for recognizing media is 4, the apparatus for recognizing media may extract the linear component corresponding to the same No. 4 direction as the skew of the medium among the linear components illustrated in FIG. 7. In FIG. 7, like reference numeral 710, the direction in which the linear component in the XB6 is detected corresponds to 4.

As illustrated in FIGS. 6 and 7, the extracted linear component may be recognized as noise depending on the positions thereof. In other words, the apparatus for recognizing media may detect the corresponding linear component as one noise when the positions of each linear component detected at the upper portion and the lower portion of the region of interest among the linear components extracted in FIGS. 6 and 7 are in the preset error range.

The operation of detecting noise from the linear component will be described with reference to the drawing illustrated in FIG. 8.

FIG. 8 illustrates the position and the direction where the noise is detected in FIGS. 6 and 7, respectively, on the image of the media recognition region.

Referring to FIG. 8, the skew of the medium is 4, and therefore the media recognition region is represented by a skew horizontal to the X-axis direction. Further, XA3, XA5, XA7, and XA10 corresponding to 70, 90, 105, 127 in the X-axis direction is represented at the upper portion of the media recognition region and directions in which each linear component is detected based on the XA3, the XA5, the XA7, and the XA10 are represented by an arrow. Further, the XB1, XB4, and the XB6 corresponding to 50, 80, and 100 in the X-axis direction are represented at the lower portion of the media recognition region and the directions in which each linear component is detected based on the XB1, XB4, and the XB6 are represented by an arrow.

In this case, the XA3 of the XA3 and the XA7 at which the linear component in the same direction as the skew at the upper portion of the region of interest is detected has the same direction as the skew but is excluded since the linear component is not detected within the error range of the position facing the XA3 at the lower portion of the region of interest. Meanwhile, since the position of the XA7 is 105 and the linear component is detected at the XB6 within the error range of the position facing the XA7, the apparatus for recognizing media detects the vertical stripe noise from the XA7 and the XB6.

Figures 9, 10:
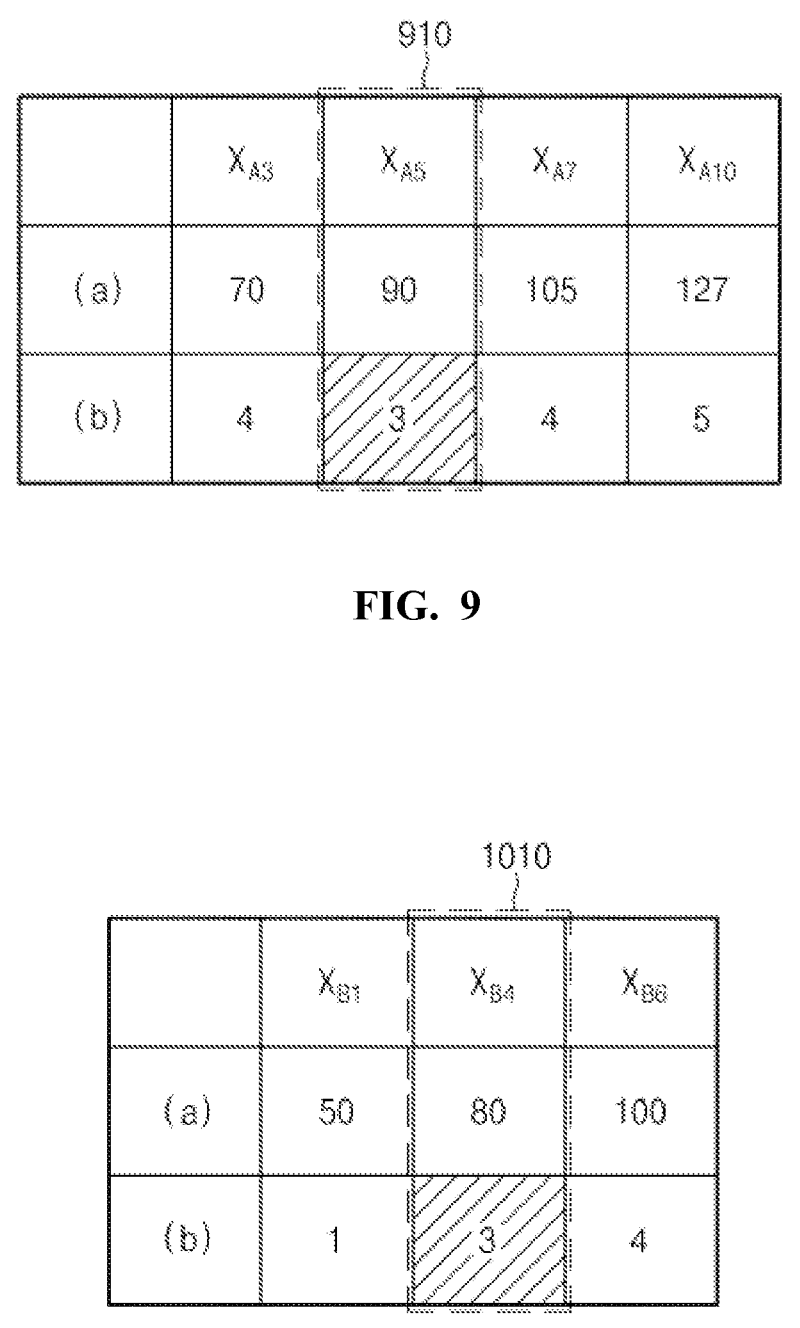

FIG. 9 illustrates the linear component detected by the first detector according to another exemplary embodiment of the present disclosure and FIG. 10 illustrates the linear component detected by the second detector according to another exemplary embodiment of the present disclosure.

Referring to FIG. 9, the apparatus for recognizing media detects data having brightness values which are equal to or less than a preset threshold, among the linear component detected by the first detector. For example, if it is assumed that data detected at XA3, XA5, XA7, and XA10 among the data detected by the first detector are detected as the linear components, a position of the XA3 is 70 and a direction of the XA3 in which the linear component is detected is No. 4 direction illustrated in FIG. 4. Further, a position of the XA5 is 90 and a direction of the XA5 in which the linear component is detected is No. 3 direction illustrated in FIG. 4. A position of the XA7 is 105 and a direction of the XA7 in which the linear component is detected is No. 4 direction illustrated in FIG. 4. A position of the XA10 is 127 and a direction of the XA10 in which the linear component is detected is No. 5 direction illustrated in FIG. 4.

Here, it is assumed that the skew of the corresponding medium detected from the media image is 3. In this case, the apparatus for recognizing media may extract the linear component corresponding to the same No. 3 direction as the skew of the medium among the linear components illustrated in FIG. 9. In FIG. 9, like reference numeral 910, the direction of the XA5 at which the linear component is detected corresponds to 3.

Meanwhile, as illustrated in FIG. 10, if it is assumed that data detected at XB1, XB4, and XB6 among the data detected by the second detector are detected as the linear components, a position of the XB1 is 50 and a direction of the XB1 in which the linear component is detected is No. 1 direction illustrated in FIG. 4. Further, a position of the XB4 is 80 and a direction of the XB4 in which the linear component is detected is No. 3 direction illustrated in FIG. 4. A position of the XB6 is 100 and a direction of the XB6 in which the linear component is detected is No. 4 direction illustrated in FIG. 4.

Similarly, it is assumed that the skew of the corresponding medium detected from the media image is 3. The apparatus for recognizing media may extract the linear component corresponding to the same No. 3 direction as the skew of the medium among the linear components illustrated in FIG. 10. In FIG. 10, like reference numeral 1010, the direction of the XB4 at which the linear component is detected corresponds to 3.

The apparatus for recognizing media may detect the corresponding linear component as one noise when the positions of each linear component detected at the upper portion and the lower portion of the region of interest among the linear components extracted in FIGS. 9 and 10 are in the preset error range.

Figure 11:
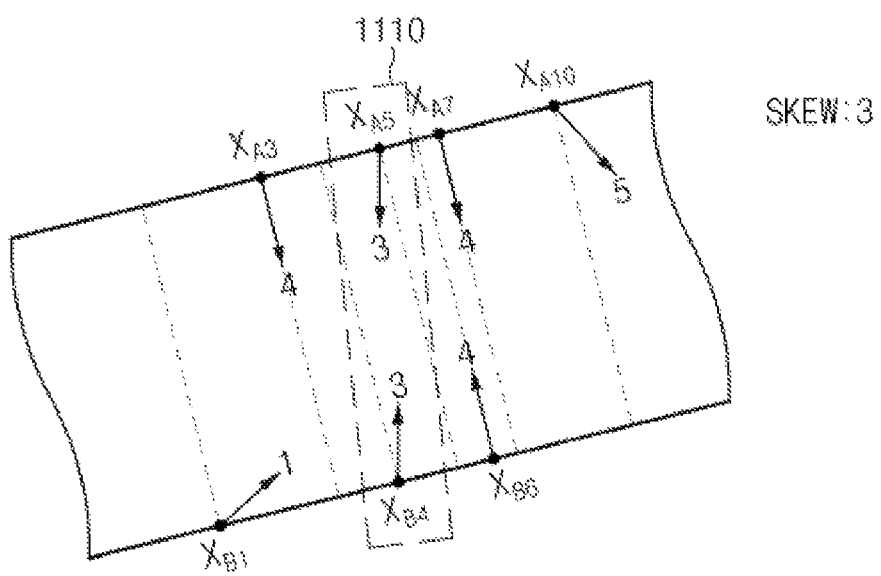

FIG. 11 illustrates the position and the direction where the linear component is detected in FIGS. 9 and 10, respectively, on the image of the media recognition region.

Since the skew of the medium is 3, FIG. 11 illustrates the media recognition region having the skewed form in which the vertical stripe of the region of interest is 3. The direction in which each linear component is detected from the XA3, the XA5, the XA7, and the XA10 corresponding to 70, 90, 105, and 127 in the X-axis direction is represented at the upper portion of the media recognition region by an arrow. Further, the direction in which each linear component is detected from the XB1, XB4, and the XB6 corresponding to 50, 80, and 100 in the X-axis direction is represented at the lower portion of the media recognition region by an arrow. Here, the apparatus for recognizing media detects the noise from the region of interest in the state in which the position correction is made by the image corrector 160.

In this case, since the linear component is detected at the XB4 within the error range of the position facing the position of the XA5 where the data in the same direction as the skew are detected at the upper portion of the region of interest, the apparatus for recognizing media detects the vertical stripe noise from a pair of XA5 and XB4.

Figures 12A, 12B:
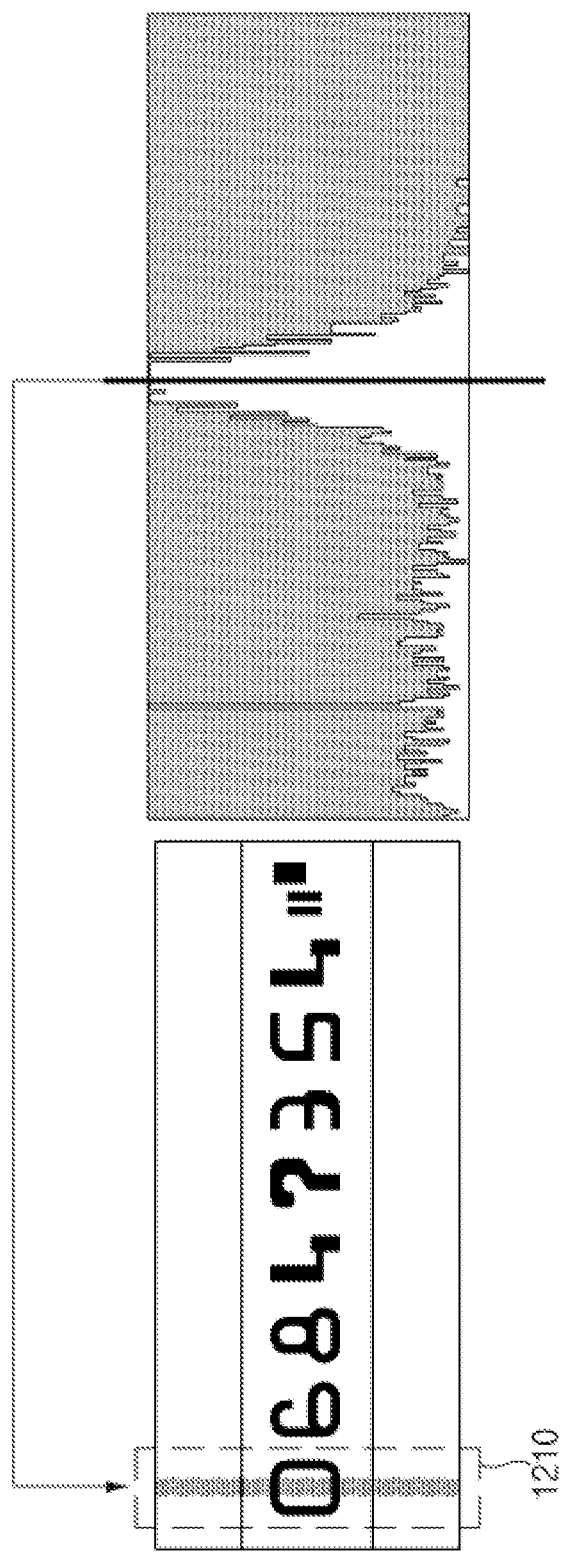
FIG. 12A and FIG. 12B are an exemplified diagram referenced for describing an operation of removing noise detected by the apparatus for recognizing media according to the exemplary embodiment of the present disclosure.

FIG. 12A and FIG. 12B illustrate an operation of removing vertical stripe noise detected in the region of interest. FIG. 12A illustrates the region of interest in which the vertical stripe noise occurs in reference numeral 1210 and FIG. 12B illustrates a graph of the background value detected in the region of interest.

The apparatus for recognizing media may remove the linear noise for reference numeral 1210 portion in the region of interest illustrated FIG. 12A based on the background value illustrated in FIG. 12B. Further, a method for removing the linear noise illustrated in FIG. 12A and FIG. 12B is an embodiment but is not limited thereto.

As such, the apparatus for recognizing media recognizes character from the region of interest from which the linear noise is removed. When the apparatus for recognizing media recognizes the character from the region of interest, if a segment region of each character is included in the region from which the noise is removed, the apparatus for recognizing media performs irrecognizable processing on the corresponding character.

Figure 13:
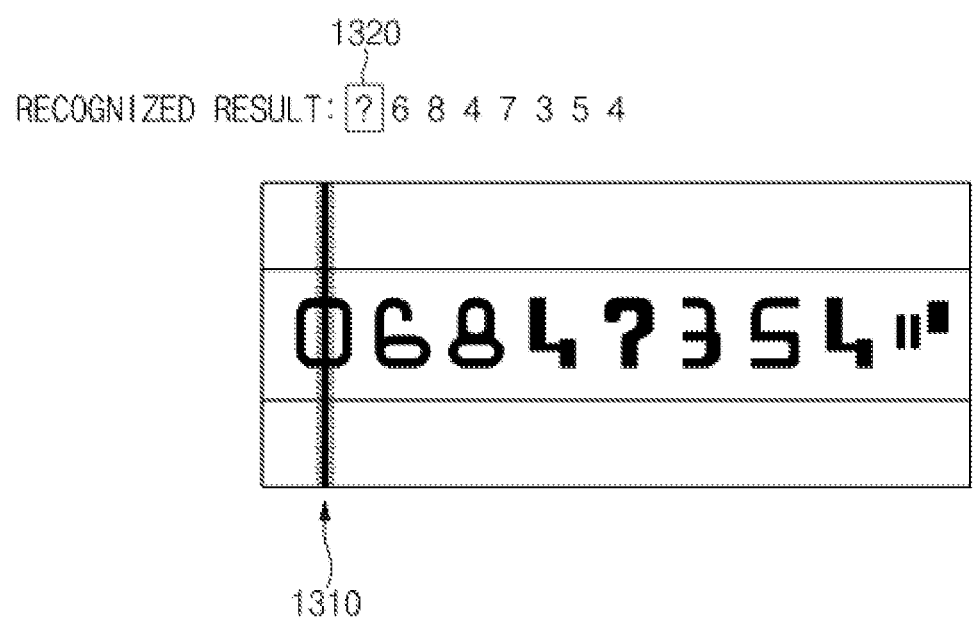
FIG. 13 is an exemplified diagram referenced for describing an operation of recognizing character by the apparatus for recognizing media according to the exemplary embodiment of the present disclosure.

Therefore, the apparatus for recognizing media performs irrecognizable processing on "0" in which the linear noise occurs like reference numeral 1320 and recognizes the rest character, among the "06847354" included in the region of interest, as illustrated in FIG. 13. In this case, the apparatus for recognizing media may output the recognized result like "?6847354" from the region of interest of the corresponding media.

According to the exemplary embodiment of the present disclosure, to solve the problem that the character are wrongly recognized due to the noise which occurring in the region of interest, the recognition rate of the character included in the image of the media inserted into the apparatus for recognizing media may be improved by removing the noise and performing the irrecognizable processing on the corresponding character.

In this case, the apparatus for recognizing media may remove only the noise from the region of interest and also recognize character when the detected noise does not overlap the region in which the character is present on the region of interest. In this case, according to the exemplary embodiment of the present disclosure, it is possible to prevent the character from being wrongly recognized or non-recognized due to the noise by removing the noise which does not overlap the character, thereby increasing the recognition rate on the information of the media.

Further, to reduce the error occurring due to the noised during the process of segmenting the character present on the region of interest, the apparatus for recognizing media may remove the noise before being segmented. In this case, according to the exemplary embodiment of the present disclosure, when the character printed on the media are recognized, it is possible to prevent the segmentation error occurring due to the noise occurring in a head region or a tail region of the character string or the error that the noise is recognized as one character among the character to be detected.

Further, according to the exemplary embodiment of the present disclosure, in the case of recognizing the character included in the plurality of media, it is possible to determine a recognition failure occurring in a specific region of the image sensor based on the phenomenon that the noise having the linear component is repeated.

Meanwhile, the skew detected in each medium may be different at the time of the transferring of the plurality of media. In this case, noise may occur in other regions of the media image and the rest character strings other than character strings which are sequentially increased or reduced on the media like a check may be non-recognized. In this case, the apparatus for recognizing media according to the exemplary embodiment of the present disclosure may recognize the character strings included in the media which is being recognized by referring to the character strings included in the recognized media before the media which is being recognized.

An operation flow of the apparatus for recognizing media according to the exemplary embodiment of the present disclosure configured as described above will be described below in detail.

Figure 14:
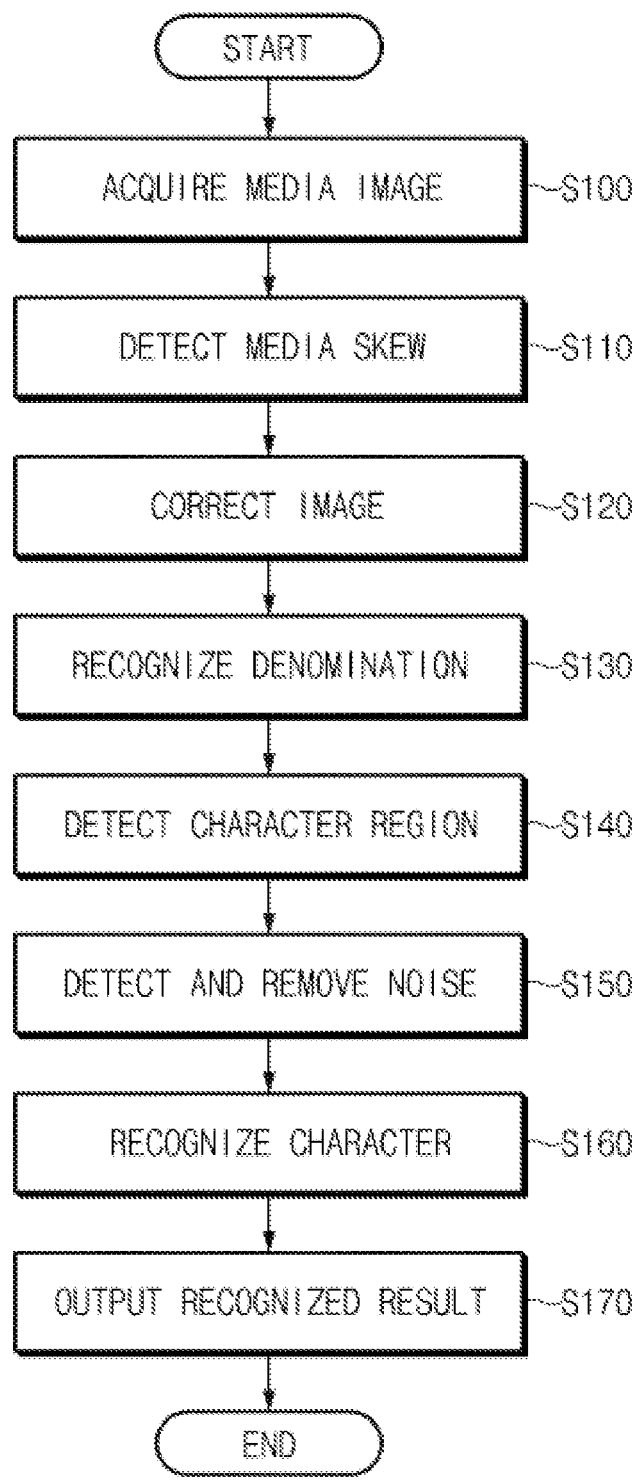
FIG. 14 is a flow chart illustrating an operation flow of a method for recognizing media according to an exemplary embodiment of the present disclosure.

FIG. 14 is a flow chart illustrating an operation flow of a method for recognizing media according to an exemplary embodiment of the present disclosure.

Referring to FIG. 14, the apparatus for recognizing media detects the skew of the corresponding medium from the image acquired during process 'S100' when the media image is acquired from the image sensor (S110). In this case, the apparatus for recognizing media uses the skew of the media detected in the process 'S110' to correct the media image (S120). In the process 'S120', the apparatus for recognizing media may correct the position so that the corresponding medium image is horizontal to the X-axis direction.

The apparatus for recognizing media analyzes the media image of which the positions are corrected in the process 'S120' to recognize the denomination of the corresponding media (S130) and detects the region of interest of the corresponding media image, for example, the region including a magnetic ink character (MIC) (S140). In this case, the apparatus for recognizing media detects the noise from the region of interest detected in the process 'S140' and removes the noise (S150).

The operation of detecting and removing the noise from the region of interest during the process 'S150' will be described with reference to the description of the embodiments of FIGS. 3 to 12.

Next, the apparatus for recognizing media recognizes the character from the region of interest from which the noise is removed, among the corresponding media image (S160). In this case, the character of the region of interest may correspond to the serial number of the media. Therefore, the apparatus for recognizing media performs the irrecognizable processing on the character including the region from which the noise is removed from the region of interest and recognizes the character from the rest region to output the recognized result (S170).

Meanwhile, all the components configuring the exemplary embodiment of the present disclosure are described as coupled in one or operated, being coupled with each other, but the present disclosure is not necessarily limited to the exemplary embodiments. That is, all the components may be operated, being optionally coupled with one or more within the scope of the present disclosure. Further, all the components may be each implemented in one independent hardware, but a part or all of each component may be selectively combined to be implemented as a computer program having a program module performing some functions or all the functions combined in one or a plurality of hardwares. Codes and code segments configuring the computer program may be easily inferred by those skilled in the art. The computer program is stored in computer readable media and is read and run by a computer and thus the exemplary embodiment of the present disclosure may be implemented. An example of the storage media of the computer program may include a magnetic recording medium, an optical recording medium, a carrier wave medium, and the like.

Further, unless particularly described to the contrary, the term "comprise", "configure", "have", or the like which are described herein will be understood to imply the inclusion of the stated components, and therefore should be construed as including other components, not the exclusion of any other elements. It is to be understood that all the terms including technical and scientific terms has the same meaning as those that are understood by those who skilled in the art, unless particularly described to the contrary. Generally used terms such as terms defined in a dictionary should be interpreted as the same meanings as meanings within a context of the related art and should not be interpreted as ideally or excessively formal meanings unless clearly defined in the present specification.

According to the exemplary embodiments of the present disclosure, it is possible to detect and remove the noise formed in the predetermined direction from the region of interest on the media image and increase the character recognition rate by recognizing the character from the region of interest from which the noise is removed.

Further, according to the exemplary embodiments of the present disclosure, it is possible to more accurately specify the region of interest by detecting and removing the noise formed in the predetermined direction from the region of interest on the media image.

In addition, according to the exemplary embodiments of the present disclosure, it is possible to increase the noise detection accuracy by detecting the noise formed in the predetermined direction using the skew information of the media.

The spirit of the present disclosure has been just exemplified. It will be appreciated by those skilled in the art that various modifications and alterations can be made without departing from the essential characteristics of the present disclosure. Accordingly, the embodiments disclosed in the present disclosure and the accompanying drawings are used not to limit but to describe the spirit of the present disclosure. The scope of the present disclosure is not limited only to the embodiments and the accompanying drawings. The protection scope of the present disclosure must be analyzed by the appended claims and it should be analyzed that all spirits within a scope equivalent thereto are included in the appended claims of the present disclosure.

What is claimed is:

1. An apparatus for recognizing a medium, the apparatus comprising:
   an image sensor;
   a skew detector configured to detect skew of the medium from a medium image acquired by the image sensor and an angle of the skew of the medium;
   a noise detector configured to detect at least one of linear components in a region of interest which includes at least one character of the medium image, a direction information of the detected linear component, and a noise included in the medium image based on the direction information of the detected linear component and the angle of the skew of the medium; and a controller configured to remove the detected noise from the region of interest and recognize the character of the region of interest from which the noise is removed;

wherein the noise detector determines a linear component having direction information corresponding with the angle of the skew of the medium as noise.

2. The apparatus according to claim 1, wherein the direction information of the linear component is determined based on at least two portions of the linear component detected from the medium image.

3. The apparatus according to claim 1, wherein the noise detector detects the noise based on a position and a direction of the linear component detected by being scanned in one direction at an upper portion and a lower portion of the region of interest, respectively.

4. The apparatus according to claim 3, wherein when the linear component is detected at one of the upper portion and the lower portion of the region of interest, the noise detector determines that the noise is present if a linear component corresponding to a detection direction of the detected linear component is detected at the other thereof based on a position and a direction of the detected linear component.

5. The apparatus according to claim 3, wherein the noise detector scans at the upper and lower portions of the region of interest to perform scanning, wherein the upper and lower portions are paired.

6. The apparatus according to claim 3, wherein when the scanning is performed in one direction at the upper portion and the lower portion of the region of interest, the noise detector detects linear components for a plurality of different directions at each point of the upper portion and the lower portion.

7. The apparatus according to claim 1, wherein the noise detector determines a detecting direction of the linear component based on the skew of the medium and detects a linear component matched with the determined detecting direction as the noise from the region of interest.

8. The apparatus according to claim 1, wherein the noise detector detects a region in which brightness equal to or less than a preset threshold in one direction within the region of interest is detected as the linear component.

9. The apparatus according to claim 1, wherein the noise detector detects, as noise, the linear components in which the detection positions of the linear components detected at the upper portion and the lower portion of the region of interest, respectively, are positioned within a preset distance error range.

10. The apparatus according to claim 9, wherein the distance error range is set based on at least one of a size of the region of interest and skew information of the medium.

11. The apparatus according to claim 1, wherein the region of interest comprises:

a first region printed with character;

a second region which is an upper region including a background of the medium in an upper direction of the first region; and a third region which is a lower region including the background of the medium in a lower direction of the first region.

12. The apparatus according to claim 11, wherein the noise detector detects the noise from the second region and the third region of the region of interest.

13. The apparatus according to claim 1, wherein the region of interest comprises a portion of a region of the medium image in which the at least one character is included or an entire medium image region.

14. The apparatus according to claim 1, wherein the at least one character included in the medium image are character strings including at least one individual character, and the controller recognizes the individual character corresponding to the region in which the noise is positioned as an unrecognizable character.

15. The apparatus according to claim 1, wherein the region of interest is set from an image obtained by correcting the position of the medium image based on the detected skew of the medium.

16. A method for recognizing a medium, the method comprising:

detecting skew of the medium based on a medium image acquired from an image sensor;

detecting at least one of linear components in a region of interest including at least one character among the medium image of which the positions are corrected, based on the skew of the medium;

detecting noise included in the medium image based on direction information of the detected linear component and angle of the skew of the medium; and removing the detected noise from the region of interest and recognizing the character of the region of interest from which the noise is removed;

wherein a linear component having direction information corresponding with the angle of the skew of the medium is determined as noise.

17. A financial device, comprising:

a customer access module device configured to have a medium inserted thereinto and released therefrom;

a bill validator configured to recognize a denomination and authenticity of the inserted medium;

a cassette configured to store the inserted medium and the released medium; and a controller configured to process deposit and withdrawal trading using the corresponding medium depending on the recognized result of the bill validator and whether the inserted medium is an abnormal medium;

wherein the bill validator detects skew of the medium from the medium image acquired by an image sensor, detects linear components for a region of interest including at least one character among the medium image, and detects noise included in the medium image based on direction information of the detected linear component and skew of the medium to recognize at least one character of the region of interest from which the noise is removed, and wherein a linear component having direction information corresponding with an angle of the skew of the medium is determined as noise.

18. The financial device according to claim 17, wherein the controller releases the corresponding medium to the customer access module device or stores the medium in the cassette depending on a kind of medium, when a character is unrecognizable in the case of recognizing the character from the medium.

* * * * *